(12) United States Patent
Matsushita et al.

(10) Patent No.: US 6,700,788 B2
(45) Date of Patent: Mar. 2, 2004

(54) CONNECTOR DEVICE FOR CARDS PERMITTING INSERTION OF DIFFERENT TYPES OF CARDS

(75) Inventors: Toshihisa Matsushita, Miyagi-ken (JP); Yoshimasa Kuroda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/323,531

(22) Filed: Dec. 18, 2002

(65) Prior Publication Data

US 2003/0137819 A1 Jul. 24, 2003

(30) Foreign Application Priority Data

Jan. 23, 2002 (JP) ........................... 2002-014080
Mar. 11, 2002 (JP) ........................... 2002-065486

(51) Int. Cl.⁷ ............................................. H05K 1/14
(52) U.S. Cl. ..................... 361/737; 361/741; 361/802; 235/492; 439/60
(58) Field of Search ..................... 361/726, 728, 361/736, 737, 741, 752, 756, 802, 807; 174/50; 235/492; 439/59, 60, 61, 62, 67

(56) References Cited

U.S. PATENT DOCUMENTS

| | | | |
|---|---|---|---|
| 5,901,049 A | 5/1999 | Schmidt et al. | |
| 6,002,605 A | 12/1999 | Iwasaki et al. | |
| 6,010,066 A * | 1/2000 | Itou et al. | 235/379 |
| 6,097,605 A * | 8/2000 | Klatt et al. | 361/737 |
| 6,137,710 A | 10/2000 | Iwasaki et al. | |
| 6,250,965 B1 * | 6/2001 | Neifer | 439/630 |
| 6,386,920 B1 * | 5/2002 | Sun | 439/630 |
| 6,402,529 B2 * | 6/2002 | Saito et al. | 439/74 |
| 6,413,108 B2 * | 7/2002 | Centofante | 439/267 |
| 6,570,767 B1 * | 5/2003 | Vapaakoski et al. | 361/737 |
| 6,574,112 B2 * | 6/2003 | Washino et al. | 361/752 |
| 2001/0010984 A1 | 8/2001 | Bricaud et al. | |
| 2003/0081388 A1 * | 5/2003 | Yang | 361/737 |
| 2003/0111541 A1 * | 6/2003 | Washino et al. | 235/492 |

FOREIGN PATENT DOCUMENTS

EP 0872807 10/1998

* cited by examiner

*Primary Examiner*—David Martin
*Assistant Examiner*—Dameon E. Levi
(74) *Attorney, Agent, or Firm*—Beyer Weaver & Thomas LLP

(57) ABSTRACT

A pressing member is provided in an accommodating section of a housing to suppress first connector terminals to press down contacts towards a bottom of the accommodating section; when a first card is inserted, a pressing member is not displaced but brings the contacts of the first connector terminals into contact with a contact terminal section of a first card; when a second card is inserted, a bottom face of the second card and the pressing member come into contact with each other to displace the pressing member; and the contacts of the first connector terminals are pressed down by that displacement to a position in which they do not come into contact with the bottom face of the second card.

8 Claims, 12 Drawing Sheets

CONNECTOR DEVICE FOR CARDS PERMITTING INSERTION OF DIFFERENT TYPES OF CARDS

BACKGROUND OF THE INVENTION

1. Field of the Invention

The present invention relates to the structure of a connector device for use with small memory cards employed in portable information terminals including mobile telephones and laptop personal computers (PCs) and memory-matched devices including digital cameras and digital audiovisual (AV) devices.

2. Description of the Prior Art

Connector devices for cards are generally used as expanded recording devices for electronic apparatuses including PCs and digital cameras. As storage media for such connector devices for cards, PC cards and memory cards have come into extensive use.

Whereas such a PC card or a memory card is inserted into a connector device for cards to write or information as required, small memory cards developed in recent years are diverse in length, thickness and other respects, and diverse connector devices for cards have also been developed to match the diversity of memory cards.

In the current situation, a connector device for cards can only match one type of memory card with the result that only one specific type of memory card can be inserted into one connector device for cards. For this reason, if many different types of memory cards are to be used, different connector devices for cards, each dedicated to only one type of memory cards, have to be made ready.

However, where different connector devices for cards, each dedicated to only one type of memory cards, are to be made ready, the electronic apparatus to mount the connector devices for cards will have to be much larger than otherwise and, moreover, there is an additional problem that a memory card might be wrongly inserted into a connector for another type of cards.

In view of this problem, to make two types of cards different in length insertable into the same connector, there is proposed a structure in which two connector terminal sections capable of coming into contact with the contact terminal section of each card are arranged in tandem in the direction of card insertion. In such a structure, however, when a longer card is to be inserted, the longer card has to go over the connector terminals arranged closer to the inlet and to be inserted as far as to a position where it can come into contact with the connector terminals arranged deeper inside, with the consequence that the bottom of the longer card is worn by friction with the connector terminals closer to the inlet and the resistance to insertion is greater than otherwise.

SUMMARY OF THE INVENTION

Therefore, an object of the present invention is to solve the problems noted above and provide a connector device for cards in which connector terminals are arranged in tandem in the inserting direction of cards to enable cards different in length to be inserted and cards to be inserted smoothly.

In order to solve the problems noted above, first means according to the invention is characterized in that it is provided with a housing having an accommodating section permitting insertion of both a short and thin first card and a second card longer and thicker than the first card, a plurality of first connector terminals to be connected to the contact terminal section of the first card, and a plurality of second connector terminals to be connected to the contact terminal section of the second card, the first and second connector terminals being respectively arranged towards an inlet and towards a deep end in a card inserting direction in the accommodating section, wherein the first connector terminals are made up of elastic pieces each having a contact supported on one end side by a bottom of the accommodating section in a cantilever way and protruding into the accommodating section on another end side; the accommodating section is provided with a pressing member to suppress the first connector terminals to press down the contacts towards the bottom of the accommodating section; when the first card is inserted, the pressing member is not displaced but the contacts of the first connector terminals and the contact terminal section of the first card come into contact with each other; and when the second card is inserted, a bottom face of the second card and the pressing member come into contact with each other to displace the pressing member, the displacement causing the contacts of the first connector terminals to be pressed down to a position in which they do not come into contact with the bottom face of the second card.

Second means according to the invention is characterized in that the housing is provided with a card insertion slot arranged in a front face of the housing and guides arranged on two sides of the card insertion slot to guide the first and second cards into the accommodating section, wherein a first guide face to guide, in contact with a flank of the first card, insertion of the first card and a second guide face to guide, in contact with a flank of the second card, insertion of the second card are formed on each of the guides; and the second guide face is formed in a position lower than the first guide face so that the bottom face of the second card to be inserted into the accommodating section is positioned lower than a bottom face of the first card to be inserted into the accommodating section.

Third means according to the invention is characterized in that the pressing member is provided with a suppressor displaceable in a vertical direction to suppress the first connector terminals and a driver to displace downwards the suppressor by its contact with the bottom face of the second card, wherein the driver is arranged in a position higher than the bottom face of the second card to be inserted into the accommodating section and lower than the bottom face of the first card to be inserted into the accommodating section.

Fourth means according to the invention is characterized in that one end part of the pressing member, which is a part closer to the inlet, is rotatably borne by the accommodating section in the card inserting direction in the accommodating section; the suppressor is formed on the deep end of the pressing member in the card inserting direction; and the suppressor is held in a state of being energized upwards by elasticity of the first connector terminals.

Fifth means according to the invention is characterized in that the first connector terminals are arranged closer to the inlet in the card inserting direction in the accommodating section than the second connector terminals, one end side of each being made up of an elastic piece supported in a cantilever way by an under side of the accommodating section into which the first card and the second card are to be inserted; the pressing member is provided with a suppressor displaceable in the vertical direction to suppress the first connector terminals and a driver to displace downwards the suppressor by its contact with the bottom face of the second card; the driver is formed protruding higher than a position of the bottom face of the second card to be inserted into the accommodating section; and when the first card is inserted, the driver is accommodated into a contact terminal section forming concave formed on a forward edge on an inserting side of the first card.

Sixth means according to the invention is characterized in that the first connector terminals, pivoting on a closer-to-the-inlet side in the card inserting direction, are extended deeper inside in a cantilever way; towards a tip of each is formed the contact to come into contact with the contact terminal section of the first card; the pressing member, pivoting for its rotation on the deep end in the card inserting direction, has towards its tip the suppressor to press the tips of the first connector terminals; and the driver is formed protruding in the vicinity of the suppressor in a direction opposite the suppressor.

Seventh means according to the invention is characterized in that a guide member to guide the second card to a position in which it comes into contact with the driver is arranged on the closer-to-the-inlet side of the pressing member in the card inserting direction.

Eighth means according to the invention is characterized in that the suppressor is energized upwards by the elasticity of the first connector terminals; the guide member is extended, pivoting for its rotation on a deeper side in the card inserting direction; and its tip is engaged with an upper face of the suppressor.

DESCRIPTION OF THE PREFERRED EMBODIMENTS

Figure 1:
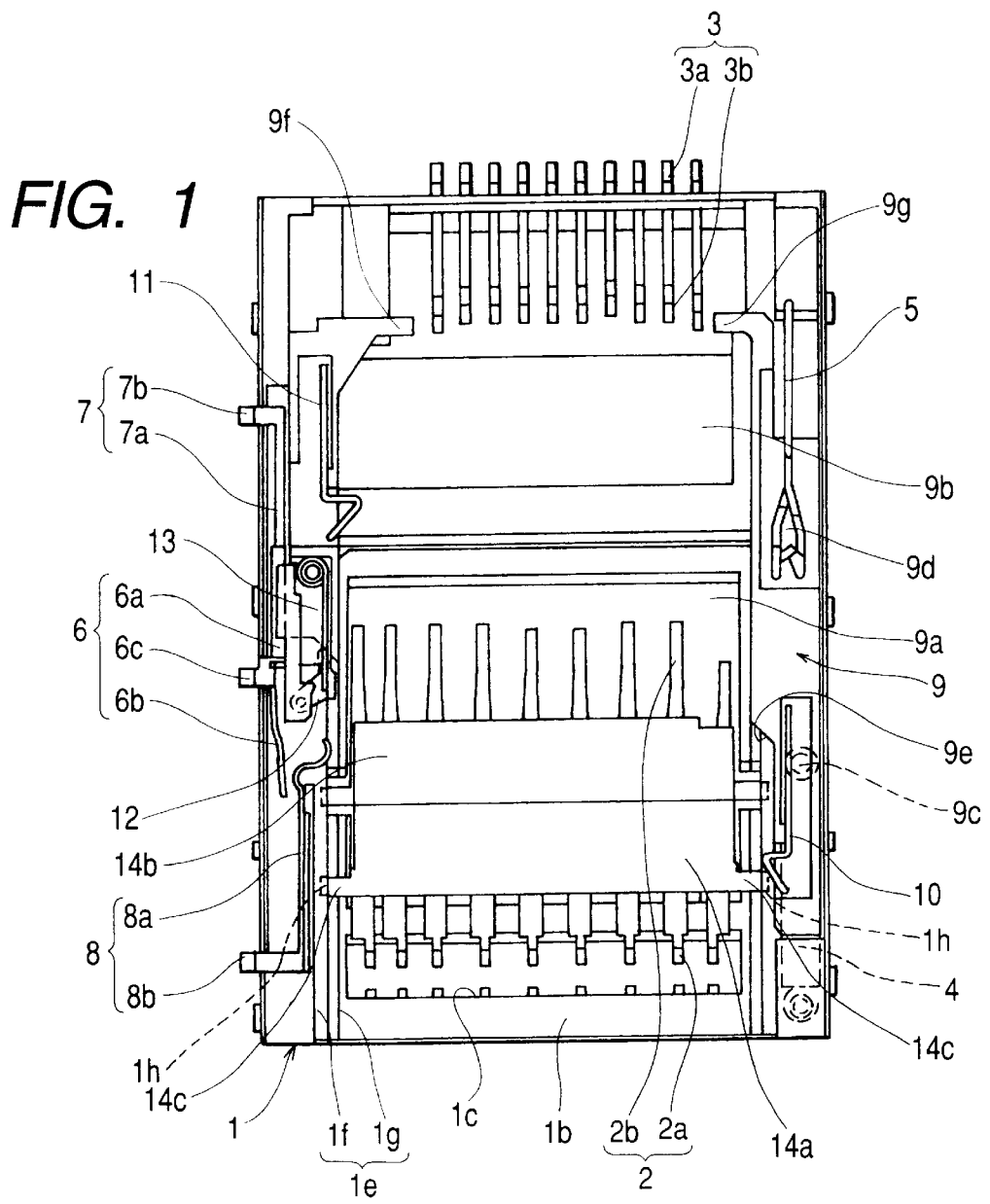
FIG. 1 shows a plan of a connector device for cards, which is a preferred embodiment of the present invention.
Figure 2:
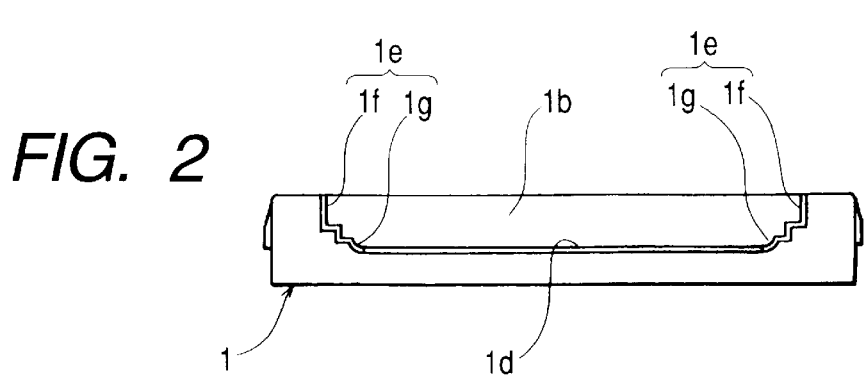
FIG. 2 shows a front view of the same connector device for cards according to the invention.
Figure 3:
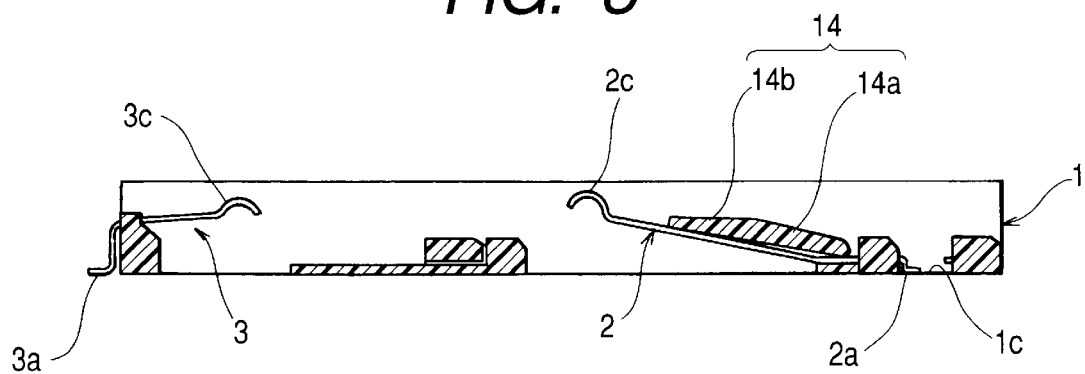
FIG. 3 shows a vertical section of the same connector device for cards according to the invention.
Figure 4:
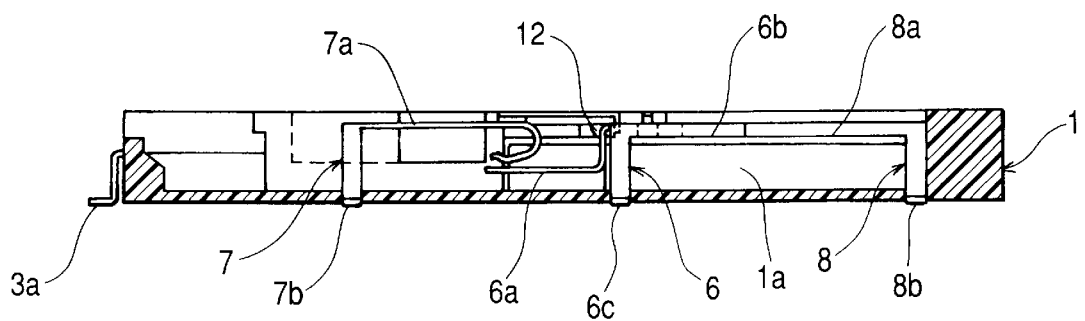
FIG. 4 shows a vertical section in another position of the same connector device for cards according to the invention.
Figure 5:
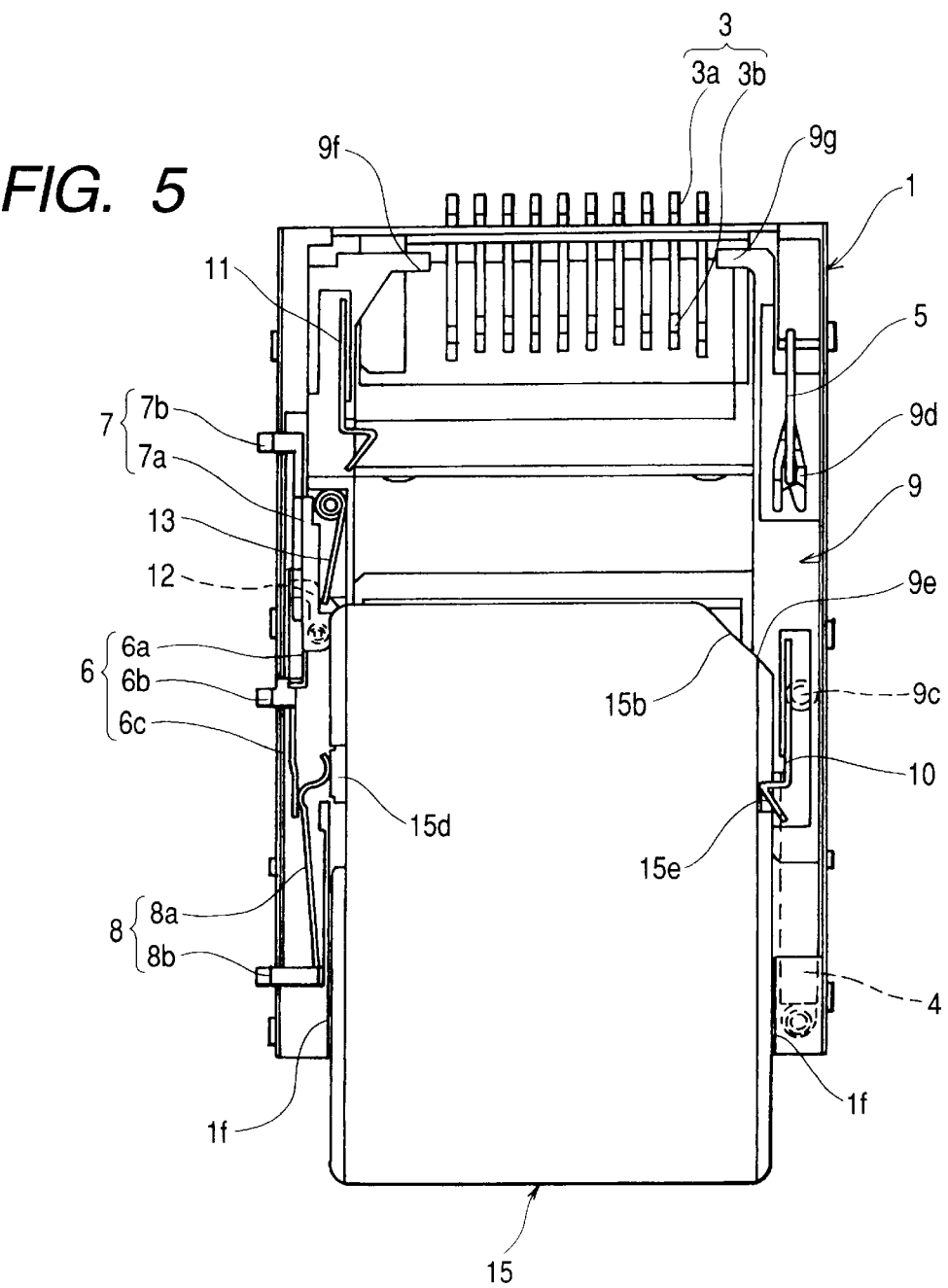
FIG. 5 shows a plan of the connector device for cards according to the invention when a first card is inserted.
Figure 6:
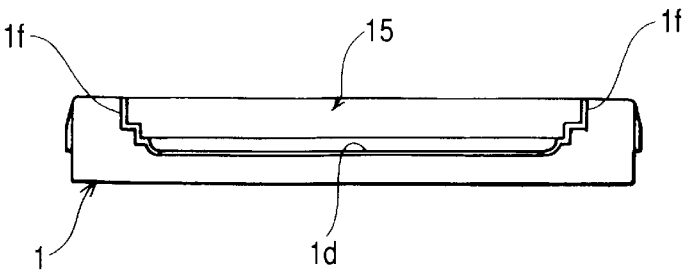
FIG. 6 shows a front view of the same connector device for cards according to the invention when the first card is inserted.
Figure 7:
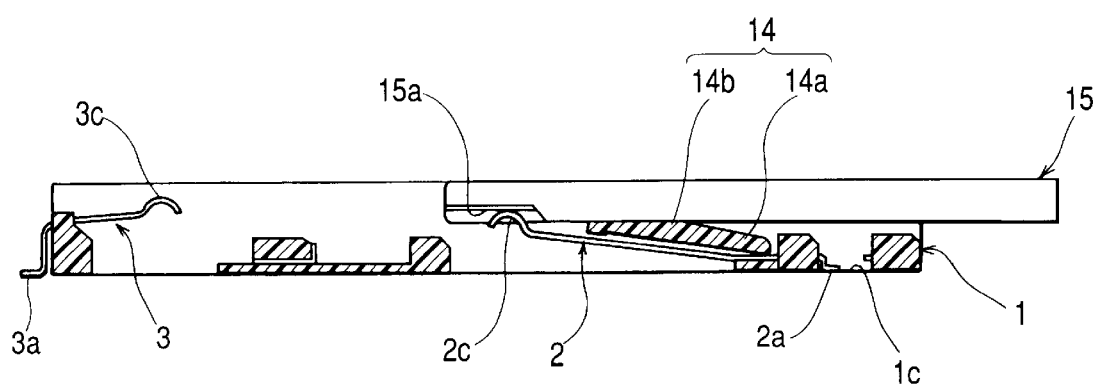
FIG. 7 shows a vertical section of the same connector device for cards according to the invention when the first card is inserted.
Figure 8:
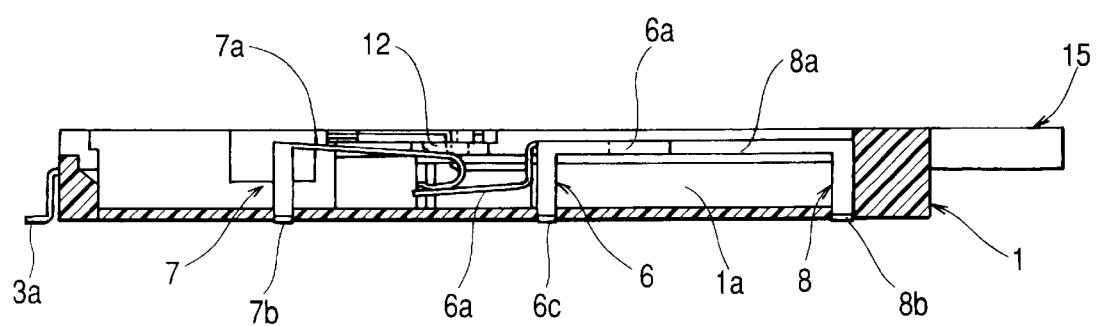
FIG. 8 shows a vertical section in another position of the same connector device for cards according to the invention when the first card is inserted.
Figure 9:
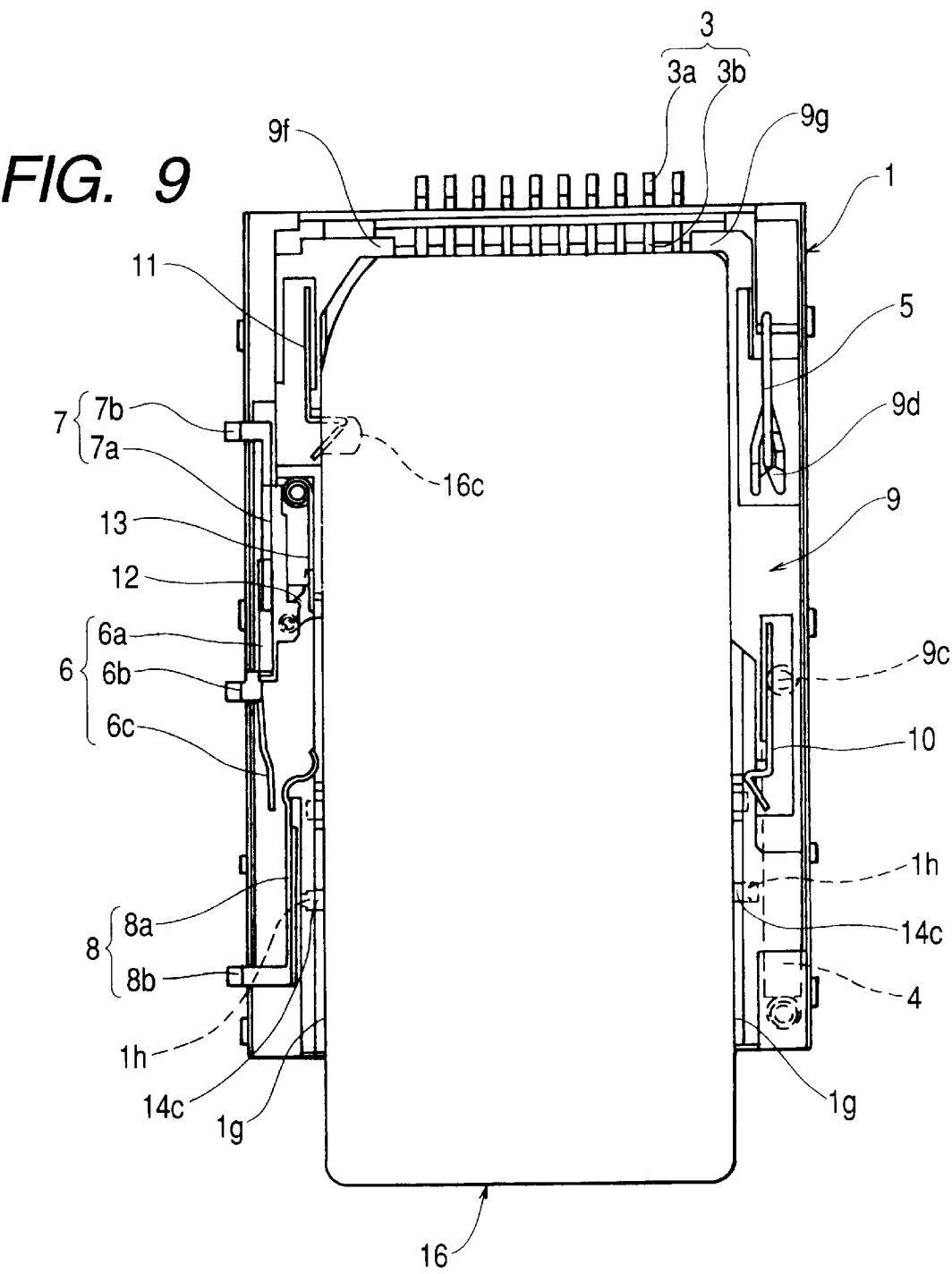
FIG. 9 shows a plan of the connector device for cards according to the invention when a second card is inserted.
Figure 10:
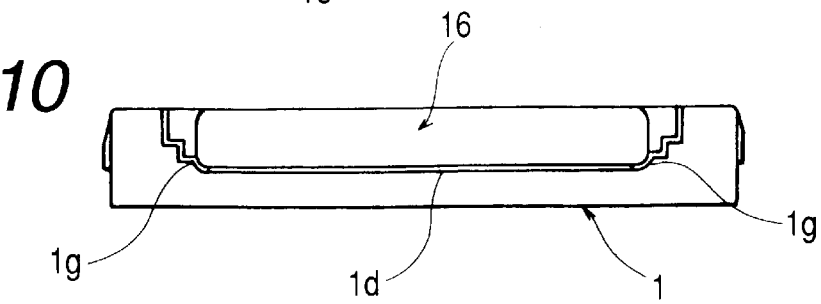
FIG. 10 shows a front view of the same connector device for cards according to the invention when the second card is inserted.
Figure 11:
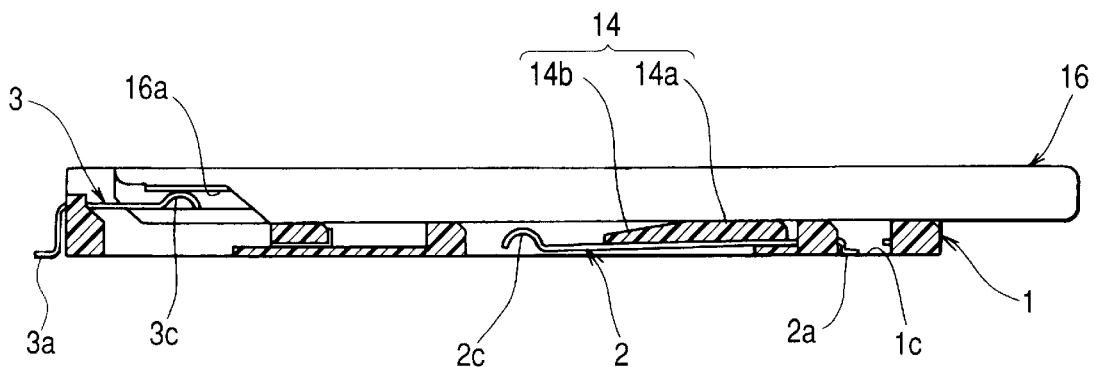
FIG. 11 shows a vertical section of the same connector device for cards according to the invention when the second card is inserted.
Figure 12:
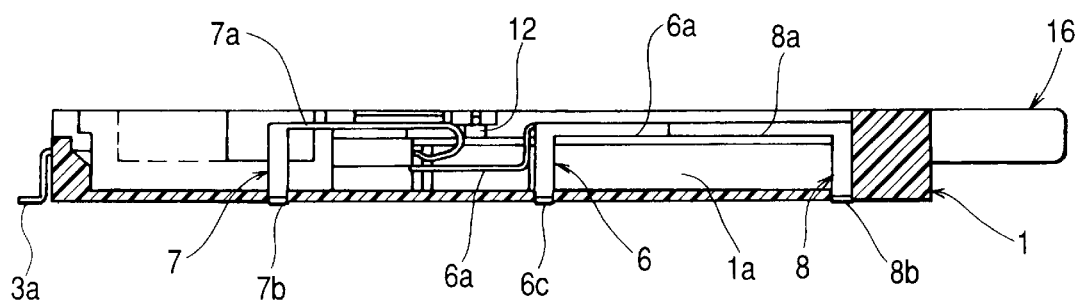
FIG. 12 shows a vertical section in another position of the same connector device for cards according to the invention when the second card is inserted.
Figure 13:
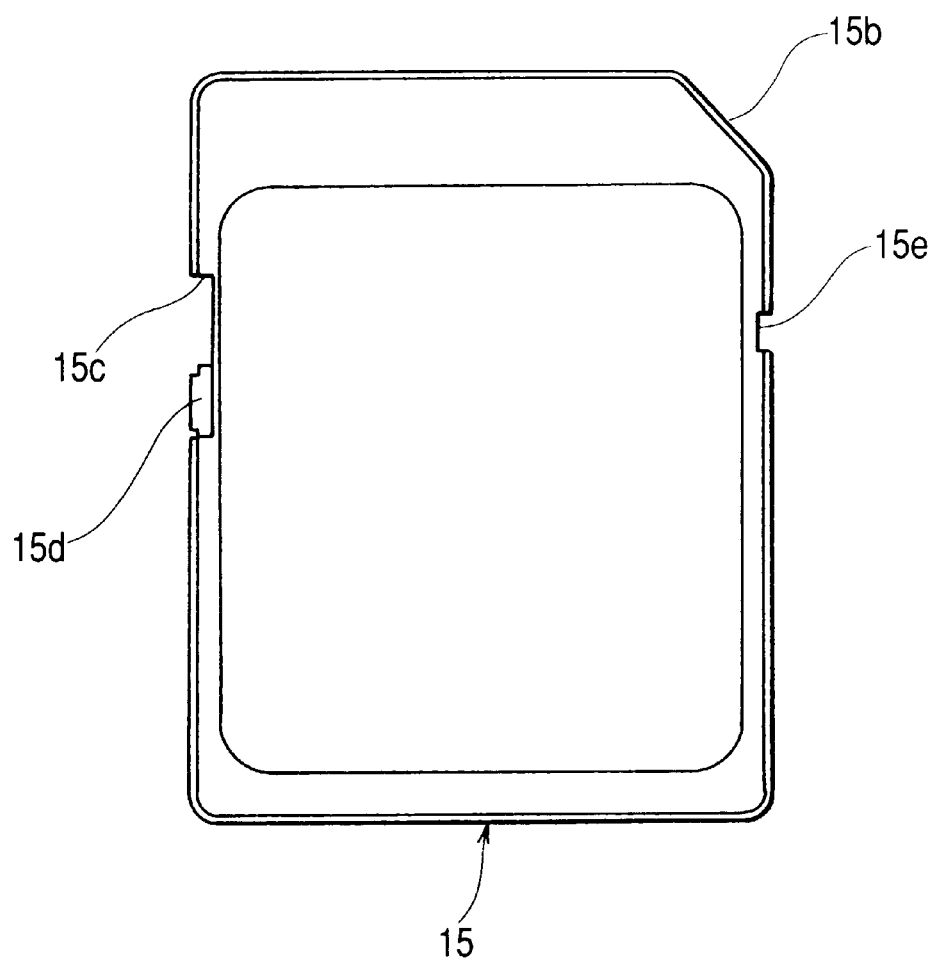
FIG. 13 shows a plan of a first card according to the invention.
Figure 14:
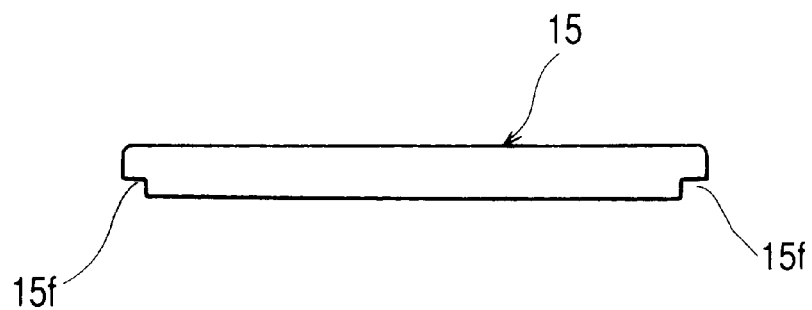
FIG. 14 shows a front view of the same first card according to the invention.
Figure 15:
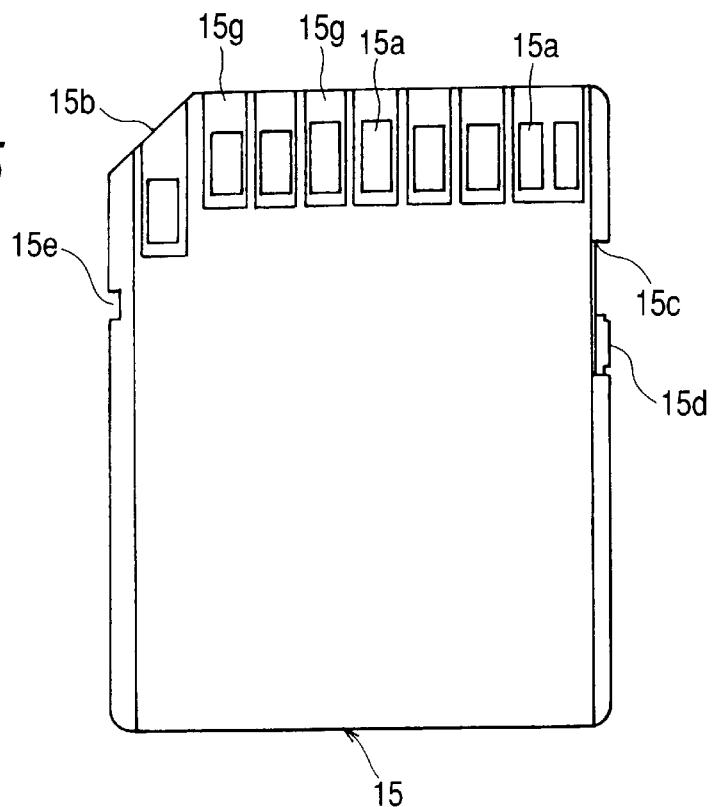
FIG. 15 shows a bottom view of the same first card according to the invention.
Figure 16:
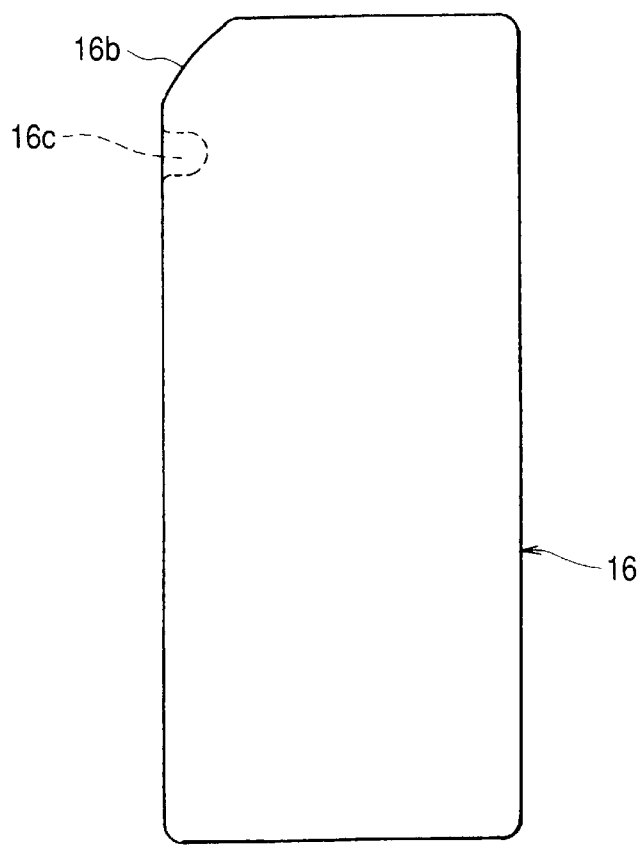
FIG. 16 shows a plan of a second card according to the invention.
Figure 17:
FIG. 17 shows a front view of the same second card according to the invention.
Figure 19:
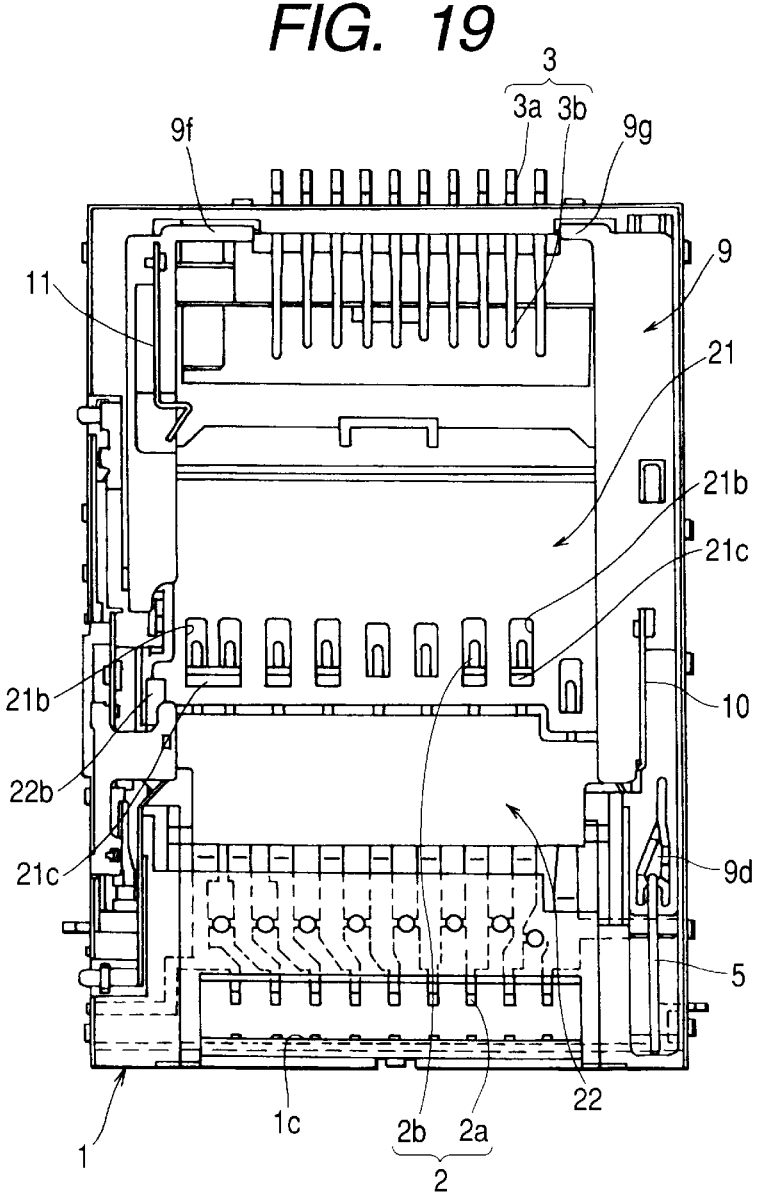
FIG. 19 shows a plan of the connector device for cards which is another preferred embodiment of the invention.
Figure 20:
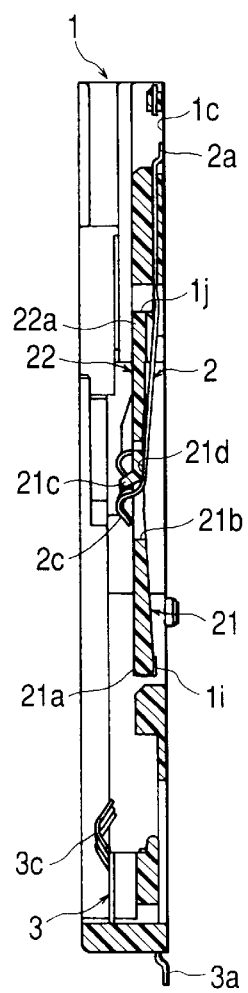
FIG. 20 shows a vertical section of the same connector device for cards according to the invention.
Figure 21:
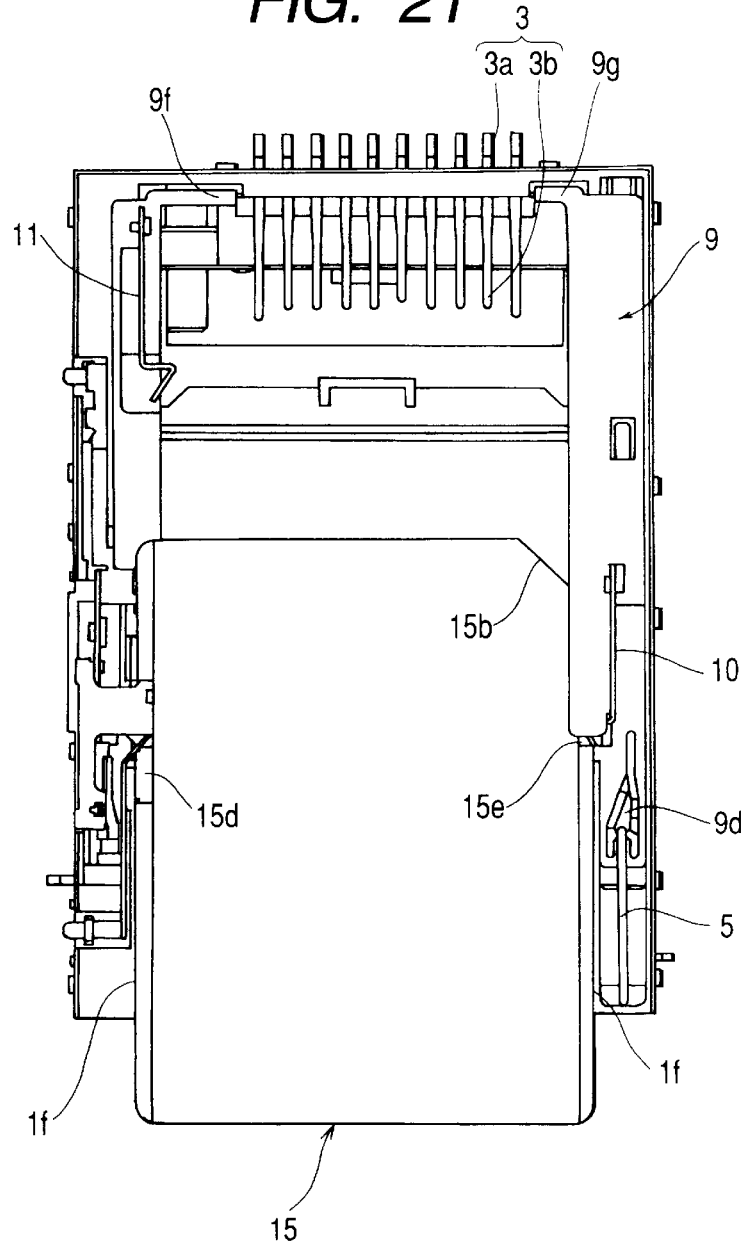
FIG. 21 shows a plan of the same connector device for cards according to the invention when the first card is inserted.
Figure 22:
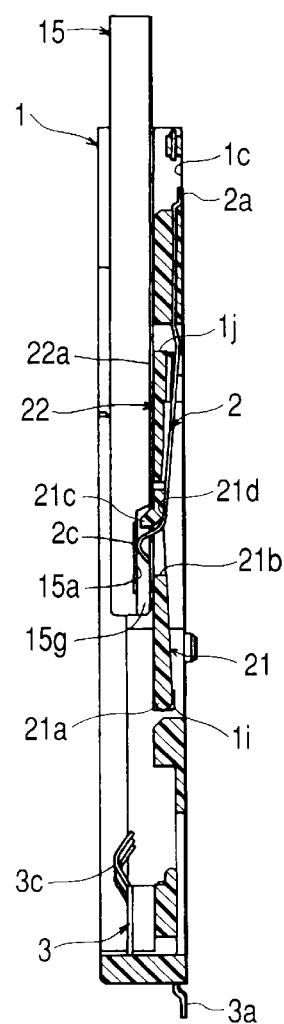
FIG. 22 shows a vertical section of the same connector device for cards according to the invention when the first card is inserted.
Figure 23:
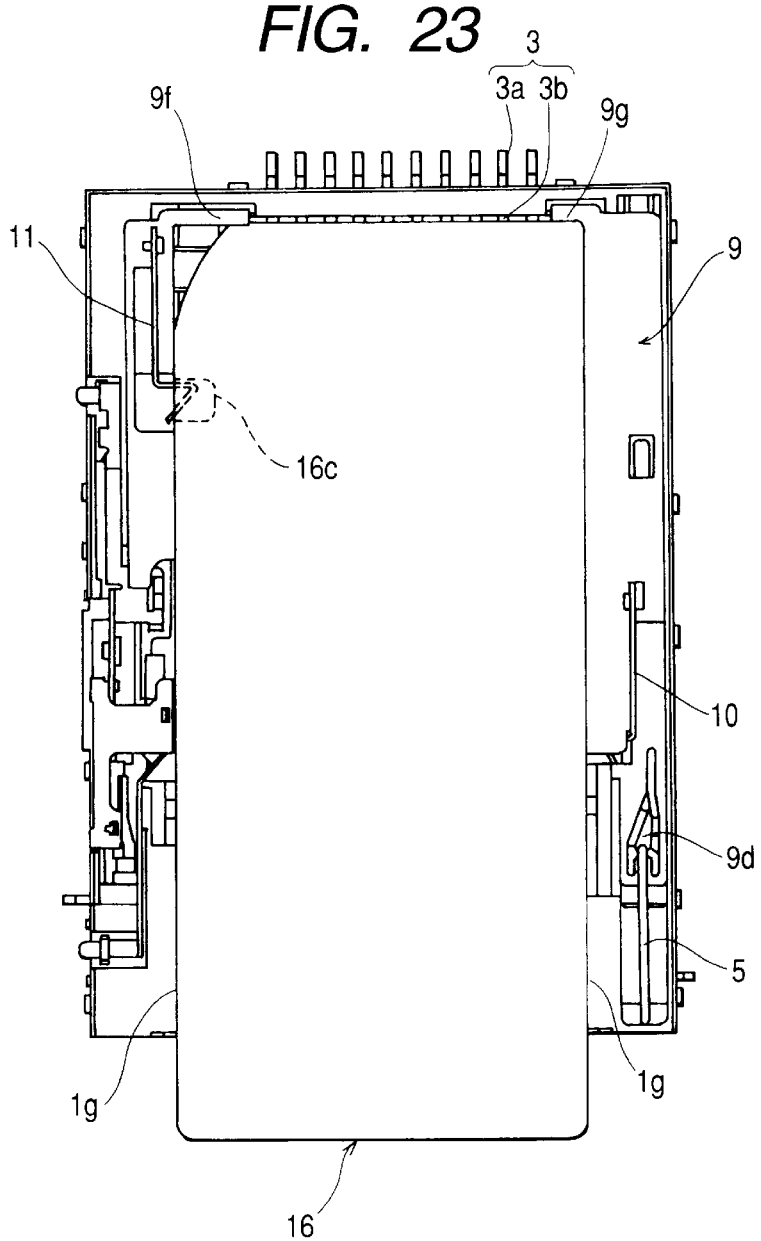
FIG. 23 shows a plan of the same connector device for cards according to the invention when the second card is inserted.

Preferred embodiments of the present invention are illustrated in FIG. 1 through FIG. 24. FIG. 1 is a plan of a connector device for cards; FIG. 2, a front view of the same; FIG. 3, a vertical section of the same; FIG. 4, a vertical section of the same in another position; FIG. 5, a plan of the connector device for cards when a first card is inserted; FIG. 6, a front view of the same; FIG. 7, a vertical section of the same; FIG. 8, a vertical section of the same in another position; FIG. 9, a plan of the connector device for cards when a second card is inserted; FIG. 10, a front view of the same; FIG. 11, a vertical section of the same; FIG. 12, a vertical section of the same in another position; FIG. 13, a plan of the first card; FIG. 14, a front view of the same; FIG. 15, a bottom view of the same; FIG. 16, a plan of the second card; FIG. 17, a front view of the same; and FIG. 18, a bottom view of the same. FIG. 19 through FIG. 24 illustrate another preferred embodiment of the invention, wherein FIG. 19 shows a plan of the connector device for cards; FIG. 20, a vertical section of the same; FIG. 21, a plan of the connector device for cards when the first card is inserted; FIG. 22, a vertical section of the same; FIG. 23, a plan of the connector device for cards when the second card is inserted; and FIG. 24, a vertical section of the same.

Referring to FIGS. 1 through 4, a housing 1 is formed of an insulating material such as synthetic resin in a rectangular box shape with its front and top being open. At the center of this housing 1 is arranged an accommodating section 1a, and in the housing 1 is also formed a card insertion slot 1b continuous from the accommodating section 1a and extending to the front face of the housing 1.

In the accommodating section 1a are arranged each of first and second connector terminals 2 and 3 in a plurality made up of an elastic electroconductive metallic material. The first connector terminals 2 are arranged in the accommodating section 1a in closer positions to the inlet in the card inserting direction, each formed of a planar base, a connecting piece 2a formed in a substantially Z shape by being bent in mutually opposite directions from this base, and a contact piece 2b. Each of the first connector terminals 2 is arranged with its connecting piece 2a, formed at one end of it, being exposed outward through an opening 1c provided in the bottom face of the accommodating section 1a, and the soldering of this connecting piece 2a to a circuit pattern on an external circuit board such as that of an electronic device enables signals to be transmitted.

The contact piece 2b, formed towards the other end of the base of each of the first connector terminals 2, is supported by the bottom of the accommodating section 1a in a cantilever way and arranged protruding into the accommodating section 1a. At the tip of the contact piece 2b is formed a contact 2c to be connected to contact terminal sections 15a of a first card 15 to be described later.

The second connector terminals 3 are arranged deeper than the positions in which the first connector terminals 2 of the accommodating section 1a are arranged, each formed of a planar base, a connecting piece 3a bent in mutually opposite directions from this base, and a contact piece 3b. Each of the second connector terminals 3 is arranged with its connecting piece 3a, formed at one end of it, being exposed outward through an outer backward side of the housing 1, and the soldering of this connecting piece 3a to a circuit pattern on an external circuit board such as that of an electronic device enables signals to be transmitted.

The contact piece 3b, formed extending towards the other end of the base of each of the second connector terminals 3, is arranged protruding into the accommodating section 1a. At the tip of the contact piece 3b is formed a contact 3c to be connected to the contact terminal section 16a of a second card 16 to be described later.

Further, the card insertion slot 1b is provided with a flat part 1d made up of a plane to guide the flat part of the second card 16 to be described later, and on two sides between which this flat part 1d is held are formed a pair of guides 1e and 1e to guide the flanks of the first and second card 15 and 16 to be described later. The card insertion slot 1b is so formed that its maximum width is substantially equal to the width of the first card 15 and its maximum thickness is substantially equal to the thickness of the second card 16.

On the pair of guides 1e and 1e are formed a plurality of guide faces made up of stepwise parallel faces, and towards the upper end of each guide 1e is formed a concave first guide face 1f to guide the first card 15 to its inserted position while keeping in contact with the flank of the first card 15. Toward the lower end of each guide 1e is formed, positioned farther inside than the concave first guide face 1f, a convex second guide face 1g to guide the second card 16 to its inserted position while keeping in contact with the flank of the second card 16.

To add, the first guide face 1f and the second guide face 1g are so formed that the first guide face 1f is located farther outside than the second guide face 1g and the second guide face 1g is situated in a lower position than the first guide face 1f, thus the two guide faces being formed in different positions in the direction of height.

The formation in this manner of the second guide face 1g in a lower position than the first guide face 1f and the formation of the bottom face of the second card 16 to be described later to be inserted into the accommodating section 1a in a lower position than the bottom face of the first card 15 to be described later to be inserted into the accommodating section 1a make it possible, by such a simple configuration that the first and second guide faces 1f and 1g to guide different types of card are formed in positions differing in the direction of height, for the contacts 2c of the first connector terminals 2 to be pressed down into a position where they will not come into contact with the bottom face of the second card 16 only when the second card 16 is inserted.

On one flank of the housing 1 is formed a spring accommodating part to accommodate a return spring 4 made up of a coil spring to energize a sliding member 9 to be described later in the direction of ejecting a card. Towards one end opposite this spring accommodating part is rotatably borne a lock pin 5, made up of a metal wire, to hold the sliding member 9 in the inserted position of the card.

On the other opposite flank of the housing 1 are arranged a fixed contact member 6, which is part of a detecting means, and a first movable contact member 7 and a second movable contact member 8 in upper and lower positions with this fixed contact member 6 between them. The fixed contact member 6 is made up of an electroconductive metal plate, and on both sides of its central base are formed planar the first contact piece 6a and second contact piece 6b opposite each other and extending in vertical directions. These the first contact piece 6a and second contact piece 6b extended from the base in a state twisted relative to each other by 90 degrees, and the contacts on their respective end sides are provided in mutually crossing directions. On the base is formed a terminal piece 6c protruding outward from an outer side of the housing 1.

The first movable contact member 7 is also made up of an electroconductive metal plate, and on it are formed a planar movable piece 7a extending from the base towards one downward end and a terminal piece 7b extending in a direction crossing the movable piece 7a and protruding outward from an outer side of the housing 1. The free end side of the movable piece 7a is bent downward in a substantially U shape, and its tip constitutes the contact to go into and out of contact with the contact of the first contact piece 6a of the fixed contact member 6.

In this case, the first contact piece 6a of the fixed contact member 6 and the movable piece 7a of the first movable contact member 7 are arranged in the housing 1 in a state of being opposite each other in the vertical direction (in this case, the direction orthogonal to the card inserting direction), and the movable piece 7a and the first contact piece 6a are formed to be displaced in the vertical direction by the pressing of the upper face of the bent part of the movable piece 7a against a rotating member 12 of the operating section to be described later. To add, by the coming into contact of the first contact piece 6a of the fixed contact member 6 and the movable piece 7a of the first movable contact member 7 with each other, the completion of the insertion of the first card 15 to be described later can be detected.

The second movable contact member 8 is also made up of an electroconductive metal plate, and on it are formed a planar movable piece 8a extending from the base towards one upward end and a terminal piece 8b extending in a direction crossing the movable piece 8a and protruding outward from an outer side of the housing 1. The free end side of the movable piece 8a is bent in a substantially S shape having inflating parts inflating in mutually opposite directions, and one of these inflating parts constitutes the contact to go into and out of contact with the contact of the second contact piece 6b of the fixed contact member 6.

In this case, the second contact piece 6b of the fixed contact member 6 and the movable piece 8a of the second movable contact member 8 are arranged in the housing 1 in a state of being opposite each other in the horizontal direction, and the movable piece 8a and the second contact piece 6b are formed to be displaced in the horizontal direction by the pressing of the other inflated part of the movable piece 8a against an identifier 15d of the first card 15 to be described later. To add, by the coming into contact of the second contact piece 6b of the fixed contact member 6 and the movable piece 8a of the second movable contact member 8 with each other, whether or not writing into the first card 15 is forbidden, to be described later, can be detected.

Thus, as the detecting means is formed of the first movable contact member 7, the fixed contact member 6 of which one end side comes into and out of contact with this first movable contact member 7 and the second movable contact member 8 of which the other end side comes into and out of contact with fixed contact member 6, the completion of the insertion of the first card 15 to be described later and of the forbiddance of writing into the first card 15 can be detected by a single detecting means.

The sliding member 9 formed of an insulating material such as synthetic resin in a substantially H shape, and on this sliding member 9 are formed a first card accommodating part 9a, positioned closer to the inlet, for accommodating the first card 15 to be described later, and a second card accommodating part 9b positioned farther backwards than this first card accommodating part 9a for accommodating the second card 16 to be described later.

To one flank of the first card accommodating part 9a is fastened a first engaging piece 10 made up of a springy metal plate or the like to engage with a positioning concave 15e provided on a flank of the first card 15 to be accommodated, and to one flank of the second card accommodating part 9b is similarly fastened a second engaging piece 11, made up of a springy metal plate or the like to engage with a positioning concave 16c provided on a flank of the second card 16.

On the other flank of the first card accommodating part 9a is formed the rotating member 12 to engaged with a corner at the forward end the first card 15 to be accommodated, and one end side of this rotating member 12 is rotatably borne by the sliding member 9. The other end side of the rotating member 12 is made rotatable in the horizontal direction along with the accommodation of the first card 15 into the first card accommodating part 9a and, when the first card 15 is inserted into the card inserting position, the other end part is brought into contact with the first contact piece 6a of the fixed contact member 6 by the pressing down of the upper face of the movable piece 7a of the first movable contact member 7.

The rotating member 12 is further provided with a spring member 13 to energize the other end in the returning direction (the direction towards the inside of the first card accommodating part 9a) and these spring member 13 and rotating member 12 constitute the operating section, which is part of the detecting means. Also, this operating section is arranged in the first card accommodating part 9a to be positioned between the first guide face 1f for guiding the insertion of the first card 15 and the second guide face 1g for guiding the insertion of the second card 16, the guide faces being provided on the two sides of the card insertion slot 1b of the housing 1.

Further, the sliding member 9 is provided with a spring engaging part 9c, accommodated in the spring accommodating part of the housing 1, to engage one end part of the return spring 4, and on one end side of the sliding member 9 is formed a heart-shaped cam groove 9d with which the other end of the lock pin 5 borne by one end side of the housing 1. By the synergy of the lock pin 5 and the heart-shaped cam groove 9d, the sliding member 9 is held in the card inserting position against the energizing action of the return spring 4.

A pressing member 14 made up of an insulating material such as synthetic resin is formed of a rectangular plate-shaped driver 14a and a suppressor 14b, similarly rectangular and plate-shaped, continuous from this driver 14a and having an upper face inclined to a certain degree. On one end side of the driver 14a are formed a pair of bearing shafts 14c protruding outwards. These bearing shafts 14c are borne by bearings 1h provided in the accommodating section 1a of the housing 1 to be able to be displaced rotatably in the vertical direction.

The tip of the suppressor 14b positioned towards the other end of the bearing shaft 14c is in contact with the first connector terminals 2 arranged in the accommodating section 1a of the housing 1, and the suppressor 14b is held in a state of being energized upwards by the elasticity of the first connector terminals 2. To add, one end part of the pressing member 14, which is the part closer to the inlet, is rotatably borne by the accommodating section 1a in the card inserting direction of the accommodating section 1a, and the suppressor 14b is formed on the other deeper end part in the card inserting direction.

Further, of the pressing member 14, the driver 14a is arranged in a position higher than the bottom face of the second card 16 to be described later inserted into the accommodating section 1a and lower than the bottom face of the first card 15 to be described later inserted into the accommodating section 1a, and it is so disposed that, when the second card 16 is inserted into the accommodating section 1a, the driver 14a is displaced by being rotated downward by its contact with the bottom face of the second card 16.

Since the driver 14a is arranged as described above in a position higher than the bottom face of the second card 16, to be described later inserted into the accommodating section 1a and lower than the bottom face of the first card 15 to be described later inserted into the accommodating section 1a, and therefore the driver 14a comes into contact with only the bottom face of the second card 16 to be described later, it is made possible by a simple configuration to press down the contacts 2c of the first connector terminals 2 to a sufficiently low position not to come into contact with the bottom face of the second card 16 only when the second card 16 is inserted.

Further, as the suppressor 14b of the pressing member 14 is held in a state of being energized upwards by the elasticity of the first connector terminals 2 and therefore it is possible to hold the pressing member 14 in its initial position by utilizing the elasticity of the first connector terminals 2, there is no need to provide a holding member specifically for that purposes, resulting in a reduced number of components and accordingly in a reduced cost.

Incidentally, though not shown, a covering member made up of a metal plate is fitted to the upper face side of the housing 1 so as to cover the opening of the upper face side of the housing 1. As this covering member is so formed as to cover the upper faces of the first and second connector terminals 2 and 3 arranged in the accommodating section 1a of the housing 1, it also serves as a shield plate to prevent the invasion of radiating noise or the like from outside.

Referring to FIGS. 13 through 15, the first card 15, accommodating an integrated circuit (IC) inside, is of a type extensively used as a recording medium. On one surface of this first card 15, a plurality of contact terminal sections 15a are formed towards one end of it, and the coming into contact of these contact terminal sections 15a with the contact pieces 2b of the first connector terminals 2 arranged in the accommodating section 1a of the housing 1 makes possible processing in many different ways of information to and from electronic devices connected outside.

In a corner of the edge of the first card 15 where the contact terminal sections 15a are formed, there is provided a diagonal cutout 15b. When the first card 15 is inserted into the first card accommodating part 9a of the sliding member 9, this cutout 15b and a corner at the other end engage with an internal engaging part 9e of the first card accommodating part 9a of the sliding member 9 and the rotating member 12, and the sliding member 9 is thereby enabled to shift in the card inserting direction along with the insertion of the first card 15.

Also, in one flank of the first card 15 is formed a concave groove 15c, which marks the forbiddance of writing into the card, and this concave groove 15c is provided with a slidable identifier 15d. By sliding this identifier 15d, the position of the concave groove 15c can be altered, and according to this position a change can be made as to whether or not to forbid writing into the card.

In the other flank of the first card 15 is formed the positioning concave 15e. By engaging the springy first engaging piece 10 provided on one flank of the first card accommodating part 9a with this concave 15e, the first card accommodating part 9a of the sliding member 9 is caused to hold the first card 15.

To add, along both edges of the lower face of the first card 15 are formed long cut grooves 15f, and there is some margin in the maximum width excluding these cut grooves 15f while the maximum thickness is somewhat thinner.

Also, in the circumferential part of the plurality of contact terminal sections 15a formed on one edge of the lower face of the first card 15, there are formed a plurality of concaves 15g for contact terminal formation in a position a step below that lower face, and the contact terminal sections 15a are arranged in the inner bottom faces of these concaves 15g for contact terminal formation.

Figure 18:
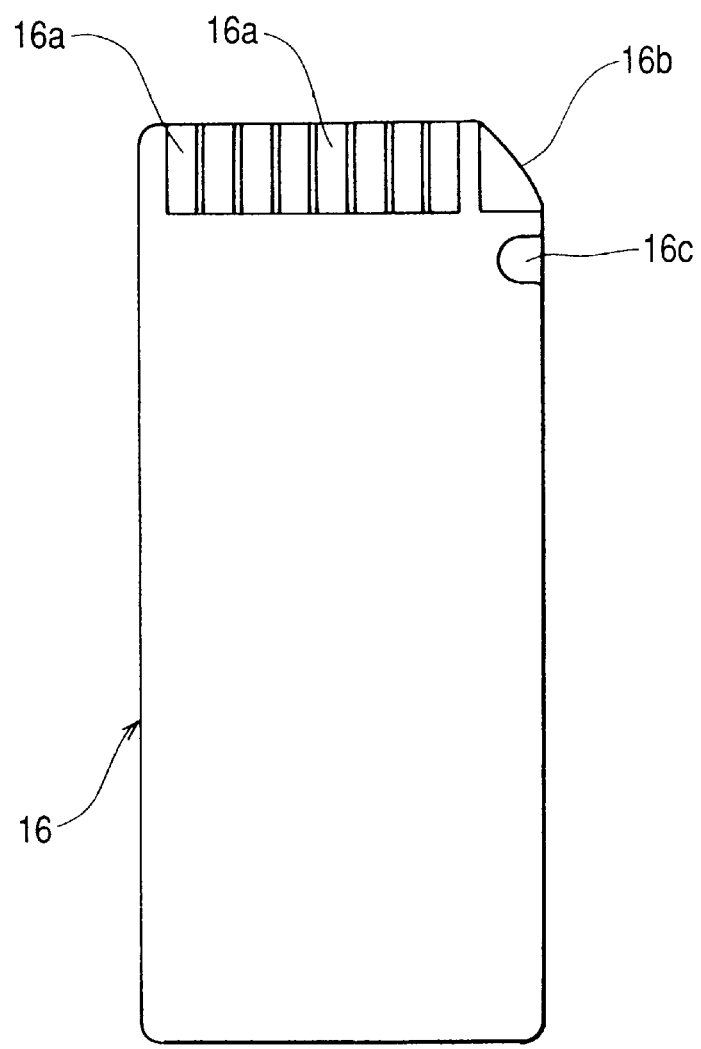
FIG. 18 shows a bottom view of the same second card according to the invention.

Referring to FIGS. 16 through 18, the second card 16, accommodating an integrated circuit (IC) inside, is of a type extensively used as a recording medium. On one surface of this second card 16, a plurality of contact terminal sections 16a are formed towards one end of it, and the coming into contact of these contact terminal sections 16a with the contact pieces 3b of the second connector terminals 3 arranged in the accommodating section 1a of the housing 1 makes possible processing in many different ways of information to and from electronic devices connected outside.

In a corner of the edge of the second card 16, there is provided a diagonal cutout 16b, and on one flank of the second card 16 at a certain distance from this cutout 16b there is formed the positioning concave 16c. When the second card 16 is inserted into the second card accommodating part 9b of the sliding member 9, the second engaging piece 11 provided on one flank of the second card accommodating part 9b engages with this concave 16c, and the second card accommodating part 9b of the sliding member 9 is thereby caused to hold the second card 16.

When the second card 16 is inserted into the second card accommodating part 9b of the sliding member 9, the forward edge of the second card 16 comes into contact with a pair of forward engaging parts 9f and 9g of the second card accommodating part 9b of the sliding member 9, and this enables the sliding member 9 to shift in the card inserting direction along with the insertion of the second card 16.

The second card 16 is formed in a substantially rectangular shape, with its maximum width somewhat smaller and its maximum thickness slightly greater than the first card 15. Its length in the inserting direction is greater than the first card 15, resulting in a longer shape.

Where the first card 15 and the second card 16 differing in shape from each other are to be inserted into the card insertion slot 1b of the housing 1 as in the configuration described above, the card insertion slot 1b in the configuration of this embodiment is so formed, as shown in FIG. 6 and FIG. 10, that its maximum width be substantially equal to the width of the first card 15 which is wider and thinner, and the maximum height of the slot 1b is formed to be substantially equal to the thickness of the second card 16 which is narrower and thicker, with the result that it can accommodate both the first and second card 15 and 16.

Further in this case, on the two sides of the card insertion slot 1b are formed the pair of guides 1e and 1e and, the concave first guide face 1f for guiding the first card 15 to its inserting position in contact with a flank of the first card 15 and the convex second guide face 1g for guiding the second card 16 to its inserting position in contact with a flank of the second card 16 are formed in these guides 1e, a plurality of types of cards differing in shape can be smoothly and securely guided to their respective inserting positions.

Further, as the second card 16 is formed longer than the first card 15 in the inserting direction, and in the accommodating section 1a of the housing 1, the first connector terminals 2 to come into contact with the contact terminal section 15a of the first card 15 and the second connector terminals 3 to come intact with the contact terminal section 16a of the second card 16 are differentiated in card inserting direction and arranged matching the respective positions in which the contact terminal sections 15a and 16a are formed, it is made possible to bring into contact securely a plurality of types of cards differing in shape and the connector terminals of the connector device into which these cards are to be inserted.

Next will be described the operation of inserting the first card 15 and the second card 16 into the connector device with reference to FIG. 5 through FIG. 12.

First in the initial state shown in FIG. 1, namely when the first card 15 is not yet inserted, the sliding member 9 is energized by the return spring 4 in the card ejecting direction, when the fixed contact member 6 and the first and second movable contact members 7 and 8 are all separate and off.

Next, as the first card 15 is inserted into the first card accommodating part 9a of the sliding member 9, the positioning concave 15e of the first card 15 is engaged by the first engaging piece 10 and held by the first card accommodating part 9a. Then, a corner of the forward edge of the first card 15 comes into contact with the rotating member 12 rotatably borne by the first card accommodating section 9a to rotate this rotating member 12 in the counterclockwise direction, when the contact terminal section 15a of the first card 15 is separated from the contacts of the contact pieces 2b of the first connector terminals 2.

Then, when the first card 15 is pressed in the card inserting direction, as the cutout 15b and the other corner of the first card 15 are engaged with the internal engaging part 9e of the first card accommodating part 9a of the sliding member 9 and the rotating member 12, the sliding member 9 is enabled to shift in the inserting direction along with the insertion of the first card 15, and the sliding member 9 shifts in the card inserting direction against the energizing force of the return spring 4 to cause one end part of the lock pin 5 to trace the heart-shaped cam groove 9d to be locked in the locking position. (FIG. 5)

When this takes place, as the driver 14a of the pressing member 14 is arranged in a lower position than, and accordingly does not come into contact with, the bottom face of the first card 15 that is inserted, neither the pressing member 14 is displaced nor the driver 14*a* is rotated to press down the contact pieces 2*b* of the first connector terminals 2, with the result that the contact terminal section 15*a* of the first card 15 comes into contact with the contacts of the contact pieces 2*b* of the first connector terminals 2. (FIG. 7)

Also at this time, as the pressing of the movable piece 7*a* of the first movable contact member 7 by the rotating member 12 brings it into contact with the first contact piece 6*a* of the fixed contact member 6, the completion of the insertion of the first card 15 can be detected. Further, as the pressing of the movable piece 8*a* of the second movable contact member 8 by the identifier 15*d* provided on the first card 15 brings it into contact with the second contact piece 6*b* of the fixed contact member 6, it can be detected whether or not writing into the first card 15 is forbidden. (FIG. 5 and FIG. 8).

In this way, as the insertion of the first card 15 prevents the pressing member 14 from rotating, it is made possible to bring into contact without fail the contact terminal section 15*a* of the first card 15 and the contacts 2*c* of the contact pieces 2*b* of the first connector terminals 2 with each other.

Next in the initial state shown in FIG. 1, namely when the second card 16 is not yet inserted, the sliding member 9 is energized by the return spring 4 in the card ejecting direction, when the fixed contact member 6 and the first and second movable contact members 7 and 8 are all separate and off.

Then, as the second card 16 is inserted into the second card accommodating part 9*b* of the sliding member 9, the positioning concave 16*c* of the second card 16 is engaged by the second engaging piece 11 and held by the second card accommodating part 9*b*. Then, the contact terminal section 16*a* of the second card 16 is separated from the contact of the contact pieces 3*b*.

Next, when the second card 16 is pressed in the card inserting direction, as the forward edge of the second card 16 engages with a pair of forward engaging parts 9*f* and 9*g* of the second card accommodating part 9*b* of the sliding member 9, the sliding member 9 is enable to shift in the inserting direction along with the insertion of the second card 16, and shifts in the card inserting direction against the energizing force of the return spring 4 to cause one end part of the lock pin 5 to trace the heart-shaped cam groove 9*d* to be locked in the locking position. (FIG. 9)

In this case, as the second card 16 is formed thicker than the first card 15 and the driver 14*a* of the pressing member 14 is arranged in a position higher than the bottom face of the inserted second card 16, the driver 14*a* is brought into contact with the bottom face of the inserted second card 16 and displaced downwards, and the suppressor 14*b* rotates pivoting on the bearing shaft 14*c* to press down the contact pieces 2*b* of the first connector terminals 2.

Along this insertion of the second card 16, the rotation of the pressing member 14 causes the bottom face of the second card 16 to be inserted to the card inserting position without coming into contact with the contacts 2*c* of the contact pieces 2*b* of the first connector terminals 2. The contact terminal sections 16*a* of the second card 16 come into contact with the contacts of the contact pieces 3*b* of the second connector terminals 3. (FIG. 11)

In this case, as the first card 15 is formed wider and thinner, the second card 16 is formed narrower and thicker than the first card 15 and the second card 16 is narrower than the first card 15, the second card 16 is inserted to the card inserting position together with the sliding member 9 without coming into contact with either the rotating member 12 provided in the first card accommodating part 9*a* or the inflated part of the movable piece 8*a* of the second movable contact member 8 provided in the housing 1 in the process of insertion. (FIG. 9 and FIG. 12)

In the configuration described above, in the closer-to-the inlet part of the accommodating section 1*a* of the housing 1, there is provided the pressing member 14 to press the first connector terminals 2, which come into contact with the contact terminal section 15*a* of the first card 15, towards the bottom side of the accommodating section 1*a*. When the first card 15 is inserted, the pressing member 14 is not displaced to allow the contacts 2*c* of the first connector terminals 2 and the contact terminal section 15*a* of the first card 15 to come into contact with each other and, when the second card 16 is inserted, the bottom face of the second card 16 and the pressing member 14 come into contact with each other to displace the pressing member 14 and thereby press down the contacts 2*c* of the first connector terminals 2 to a position where they do not come into contact with the bottom face of the second card 16. As a result, when the long and thick second card 16 is inserted into the accommodating section 1*a*, the contacts 2*c* of the first connector terminals 2 arranged in the closer-to-the inlet part of the accommodating section 1*a* are pressed down to a position where they do not come into contact with the bottom face of the second card 16, so that it is possible to prevent the resistance to card insertion from increasing and the bottom face from being worn by frication with the first connector terminals 2, and thereby to let either card be inserted smoothly.

FIG. 19 through FIG. 24 illustrate the configuration of a connector device for cards, which is another preferred embodiment of the present invention, differing partly from the above-described embodiment in the configuration of a pressing member formed to press down the contacts 2*c* of the first connector terminals 2, while being kept in contact with the bottom face of the second card 16, to a position in which they do not come into contact with the bottom face of the second card 16.

The same component parts as those described with reference to FIG. 1 through FIG. 18 are denoted by respectively the same reference signs, and their description will be dispensed with.

Referring to FIG. 19 and FIG. 20, a pressing member 21, made up of an insulating material such as synthetic resin is formed in a substantially rectangular plate. On one end side of the pressing member 21 are formed a pair of bearing shafts 21*a*, and these bearing shafts 21*a* are borne by bearings 1*i* provided in the accommodating section 1*a* of the housing 1 to be able to be displaced rotatably in the vertical direction. Towards the other end of the pressing member 21, opposite the bearing shafts 21*a*, there are arranged a plurality of window holes 21*b*, and at one end each of some of the plurality of window holes 21*b* is formed a driver 21*c* made up of an upward protrusion.

Also, the bearing shafts 21*a* is rotatably borne by the pressing member 21 deeper along the card inserting direction in the accommodating section 1*a*, and the window holes 21*b* and the driver 21*c* are arranged closer to the inlet. The first connector terminals 2 are supported by the closer-to-the inlet side of the card inserting direction in a cantilever way towards the deeper side, and the pressing member 21 and the first connector terminals 2 are engaged with each other, with the contacts 2*c* formed at the tips of the first connector terminals 2 being pressed into the window holes 21*b* of the pressing member 21 to protrude from the upper side of the pressing member 21.

The pressing member 21 then is in a state of being energized upward by the elasticity of the first connector terminals 2 as one end each of the lower face sides of the window holes 21*b*, namely one end opposite the position in which the driver 21*c* is formed is in contact with the contact pieces 2b of the first connector terminals 2. Also the lower face side of the pressing member 21 opposite the driver 21c constitutes a suppressor 21d to press downwards and displace the first connector terminals 2.

Also, the pressing member 21 is arranged in a position where the driver 21c comes somewhat lower than the inner bottom face of the concaves 15g for contact terminal formation of the first card 15 inserted into the accommodating section 1a. When the first card 15 is inserted into the accommodating section 1a, the driver 21c enters into a state in which is accommodated in the concaves 15g for contact terminal formation of the first card 15, and the driver 21c does not come into contact with the first card 15. When the second card 16 is inserted into the accommodating section 1a, the driver 21c is pressed downward by its contact with the bottom face of the second card 16, and the rotation of the pressing member 21 causes the first connector terminals 2 to be pressed downward by the suppressor 21d to be displaced.

The closer-to-the-inlet part of the pressing member 21 in the card inserting direction is formed a substantially rectangular planar guide member 22, similarly made up of an insulating material such as synthetic resin. Towards one end of this guide member 22 is provided a bearing shaft 22a borne by a bearing 1j provided in the accommodating section 1a of the housing 1 to enable the guide member 22 to be rotated in the vertical direction.

The bearing shaft 22a of the guide member 22 is rotatably borne on the closer-to-the-inlet side in the card inserting direction of the accommodating section 1a, and on both sides of the other end of this bearing shaft 22a are provided engaging parts 22b to engaged with the upper face towards the tip of the pressing member 21, where the driver 21c is formed. The guide member 22 is in a state in which the engaging parts 22b are in contact with the pressing member 21, and is held in a state of being energized upwards (towards its initial position) via the pressing member 21 by the elasticity of the first connector terminals 2.

As the guide member 22 for guiding the second card 16 to a position in which it comes into contact with the driver 21c is thus arranged on the closer-to-the-inlet side of the pressing member 21 in the card inserting direction, the insertion of the second card 16 is guided by the guide member 22 so that the second card 16 is to be smoothly inserted to the position it comes into contact with the driver 21c of the pressing member 21 and the bottom face of the second card 16 is securely brought into contact with the driver 21c, with the result that the first connector terminals 2 can be pressed down to a position in which they do not come into contact with the bottom face of the second card 16.

As the suppressor 21d on the tip side of the pressing member 21 is energized upwards by the elasticity of the first connector terminals 2, the guide member 22 pivoting for rotation on the closer-to-the-inlet side in the card inserting direction is extended deeper inside, and its tip is so formed as to engaged with the upper face of the suppressor 21d of the pressing member 21, the pressing member 21 and the guide member 22 can be held in their respective initial positions by utilizing the elasticity of the first connector terminals 2, with the result that there is no need to provide dedicated energizing members for holding the pressing member 21 and the guide member 22 upward so that the number of component parts and accordingly the cost can be reduced.

Next will be described, with reference to FIG. 21 through FIG. 24, the operations to insert the first card 15 and the second card 16 into the connector device.

The operations of other component parts than the pressing member 21 and the guide member 22 will not be described because they are substantially the same as those described with reference to FIG. 5 through FIG. 12.

When the first card 15 inserted into the accommodating section 1a, its positioning concave 15e is engaged with the first engaging piece 10, and the first card 15 is held by the first card accommodating part 9a. In this process, the pressing member 21 is held in its initial position by the engagement with the guide member 22 against the energizing force of the first connector terminals 2.

As the driver 21c formed on the pressing member 21 is then arranged in a position lower than the inner bottom face of the concaves 15g for contact terminal formation of the inserted first card 15 and therefore does not come into contact with the first card 15, the pressing member 21 is not displaced, and as the driver 21c does not rotate to press down the contact pieces 2b of the first connector terminals 2, the contact terminal section 15a of the first card 15 comes into contact with the contacts 2c of the contact pieces 2b of the first connector terminals 2. (FIG. 22)

As the driver 21c is thus accommodated into the concaves 15g for contact terminal formation of the first card 15 and the insertion of the first card 15 does not cause the pressing member 21 to rotate, it is made possible to bring the contact terminal section 15a of the first card 15 and the contacts 2c of the contact pieces 2b of the first connector terminals 2 into contact with other without fail.

Then, when the second card 16 is inserted into the accommodating section 1a, its positioning concave 16c is engaged with the second engaging piece 11, and the second card 16 is held by the second card accommodating part 9b. In this process, the second card 16 presses itself through the first card accommodating section 9a, and passes above the first connector terminals 2 arranged on the closer-to-the-inlet side in the card inserting direction of the accommodating section 1a to be inserted.

As the second card 16 here is formed thicker than the first card 15 and the driver 21c of the pressing member 21 is so formed as to protrude higher than the position of the bottom face of the second card 16 to be inserted into the accommodating section 1a, the driver 21c is pressed downward in contact with the bottom face of the inserted second card 16, with the result that the suppressor 21d rotates downwards pivoting on the bearing shafts 21a to press the contact pieces 2b of the first connector terminals 2 downwards.

Figure 24:
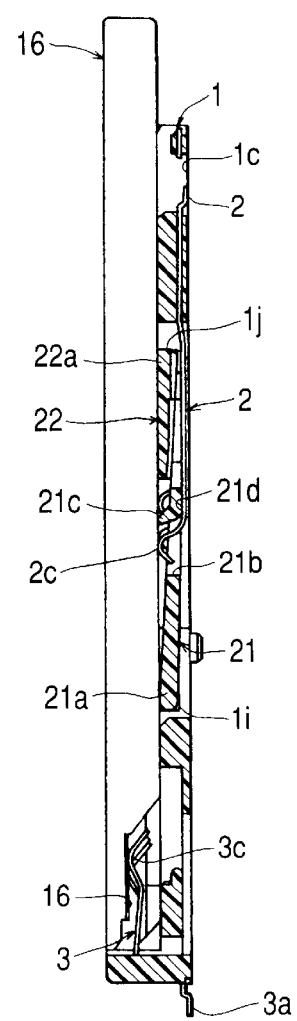
FIG. 24 shows a vertical section of the same connector device for cards according to the invention when the second card is inserted.

The rotation of the pressing member 21 accompanying this insertion of the second card 16 enables the second card 16 to be inserted to the card inserting position without allowing its bottom face to come into contact with the contacts 2c of the contact pieces 2b of the first connector terminals 2, and the contact terminal section 16a of the second card 16 comes into contact with the contacts 3c of the contact pieces 3b the second connector terminals 3. (FIG. 24)

Thus, as the suppressor 21d to press the tips of the first connector terminals 2 is formed at the tip of the pressing member 21 and the driver 21c is formed to protrude in the vicinity of the suppressor 21d in a direction opposite the suppressor 21d, when the second card 16 is inserted, the bottom face of the second card 16 can press the driver 21c without fail, and the pressing down of the driver 21c can serve to press down the contacts 2c of the first connector terminals 2, resulting in a reduced resistance to the insertion of the second card 16.

In the embodiment of the invention described above, the pressing member 21 is provided with the suppressor 21d, displaceable in the vertical direction, to press the first connector terminals 2 and the driver 21c to displace downwards the suppressor 21d by bringing it into contact with the bottom face of the second card 16; the driver 21c is formed to protrude higher than the position of the bottom face of the second card 16 inserted into the accommodating section 1a; as the driver 21c is accommodated into the concaves 15g for contact terminal formation formed on the inserting side forward edge of the first card 15 when the first card 15 is inserted, protrusion of the driver 21c into the concaves 15g for contact terminal formation of the first card 15 can cause it to protrude higher than the position of the bottom face of the first card 15, the contacts 2c of the first connector terminals 2 can be pressed down without fail to a position in which they do not come into contact with the bottom face of the second card 16 when the second card 16 is inserted even where the thickness difference between the first card 15 and the second card 16 is small.

As hitherto described, a connector device for cards according to the present invention is provided with a housing having an accommodating section permitting insertion of both a short and thin first card and a second card longer and thicker than the first card, a plurality of first connector terminals to be connected to the contact terminal section of the first card, and a plurality of second connector terminals to be connected to the contact terminal section of the second card, the first and second connector terminals being respectively arranged towards an inlet and towards a deep end in a card inserting direction in the accommodating section, wherein the first connector terminals are made up of elastic pieces each having a contact supported on one end side by a bottom of the accommodating section in a cantilever way and protruding into the accommodating section on another end side; the accommodating section is provided with a pressing member to suppress the first connector terminals to press down the contacts towards the bottom of the accommodating section; when the first card is inserted, the pressing member is not displaced but the contacts of the first connector terminals and the contact terminal section of the first card come into contact with each other; and when the second card is inserted, a bottom face of the second card and the pressing member come into contact with each other to displace the pressing member, the displacement causing the contacts of the first connector terminals to be pressed down to a position in which they do not come into contact with the bottom face of the second card, namely the displacement causing the contacts of the first connector terminals arranged closer to the inlet to be pressed down to a position where they do not come into contact with the bottom face of the second card when the long and thick second card is inserted in the accommodating section, with the resultant advantage that it is possible to prevent the resistance to card insertion from increasing and the card bottom face from being worn by frication with the first connector terminals, and thereby to let either card be inserted smoothly.

The housing may be provided with a card insertion slot arranged in a front face of the housing and guides arranged on two sides of the card insertion slot to guide the first and second cards into the accommodating section, wherein a first guide face to guide, in contact with a flank of the first card, insertion of the first card and a second guide face to guide, in contact with a flank of the second card, insertion of the second card are formed on each of the guides, and the second guide face is formed in a position lower than the first guide face so that the bottom face of the second card to be inserted into the accommodating section is positioned lower than a bottom face of the first card to be inserted into the accommodating section, with the resultant advantage that it is made possible, by a simple configuration to form the guide faces to guide the different cards in positions differing in the vertical direction, to press down the contacts of the first connector terminals to a position where they may not come into contact with the bottom face of the second card only when the second card is inserted.

The pressing member may be provided with a suppressor displaceable in a vertical direction to suppress the first connector terminals and a driver to displace downwards the suppressor by its contact with the bottom face of the second card, wherein the driver is arranged in a position higher than the bottom face of the second card to be inserted into the accommodating section and lower than the bottom face of the first card to be inserted into the accommodating section, with the resultant advantage that, because the driver is in contact only with the bottom face of the second card, it is made possible by a simple configuration to press down the contacts of the first connector terminals to a position where they may not come into contact with the bottom face of the second card only when the second card is inserted.

One end part of the pressing member, which is a part closer to the inlet, maybe rotatably borne by the accommodating section in the card inserting direction in the accommodating section; the suppressor being formed on the deep end of the pressing member in the card inserting direction; and the suppressor being held in a state of being energized upwards by elasticity of the first connector terminals, with the resultant advantage that, because of the configuration to utilize the elasticity of the first connector terminals to hold the pressing member in its initial position, there is no need to provide any special holding member and accordingly it is made possible to reduce the number of components and the cost.

The first connector terminals may be arranged closer to the inlet in the card inserting direction in the accommodating section than the second connector terminals, one end side of each being made up of an elastic piece supported in a cantilever way by an under side of the accommodating section into which the first card and the second card are to be inserted; the pressing member is provided with a suppressor displaceable in the vertical direction to suppress the first connector terminals and a driver to displace downwards the suppressor by its contact with the bottom face of the second card; the driver is formed protruding higher than a position of the bottom face of the second card to be inserted into the accommodating section; and when the first card is inserted, the driver is accommodated into a contact terminal section forming concave, formed on a forward edge on an inserting side of the first card, with the resultant advantage that, because the protrusion of the driver into the contact terminal section forming concave for the first card enables it to protrude higher than the position of the bottom face of the first card, it is made possible to press down the contacts of the first connector terminals without fail to a position in which they do not come into contact with the bottom face of the second card when the second card is inserted even where the thickness difference between the first card and the second card is small.

The first connector terminals, pivoting on a closer-to-the-inlet side in the card inserting direction, may be extended deeper inside in a cantilever way; towards a tip of each is formed the contact to come into contact with the contact terminal section of the first card; the pressing member, pivoting for its rotation on the deep end in the card inserting direction, has towards its tip the suppressor to press the first connector terminals; and the driver is formed protruding in the vicinity of the suppressor in a direction opposite the suppressor, with the resultant advantage that it is made possible to press without fail the driver with the bottom face of the second card and to press down the contacts of the first connector terminals and thereby to reduce the resistance to the insertion of the second card.

A guide member to guide the second card to a position in which it comes into contact with the driver may be arranged on the closer-to-the-inlet side of the pressing member in the card inserting direction, with the resultant advantage that it is made possible to smoothly insert the second card and to press down the first connector terminals to a position where they do not come into contact with the bottom face of the second card.

The suppressor maybe energized upwards by the elasticity of the first connector terminals; the guide member is extended, pivoting for its rotation on a deeper side in the card inserting direction; and its tip is engaged with an upper face of the suppressor, with the resultant advantage that it is made possible to reduce the number of components and the cost because there is no need to provide any special energizing member to energize the pressing member and the guide member upwards and hold them there.

What is claimed is:

1. A connector device for cards provided with a housing having an accommodating section permitting insertion of both a short and thin first card and a second card longer and thicker than the first card, a plurality of first connector terminals to be connected to the contact terminal section of the first card, and a plurality of second connector terminals to be connected to the contact terminal section of the second card, the first and second connector terminals being respectively arranged towards an inlet and towards a deep end in a card inserting direction in the accommodating section, wherein the first connector terminals are made up of elastic pieces each having a contact supported on one end side by a bottom of the accommodating section in a cantilever way and protruding into the accommodating section on another end side; wherein the accommodating section is provided with a pressing member to suppress the first connector terminals to press down the contacts towards the bottom of the accommodating section; wherein when the first card is inserted, the pressing member is not displaced but the contacts of the first connector terminals and the contact terminal section of the first card come into contact with each other; and wherein when the second card is inserted, a bottom face of the second card and the pressing member come into contact with each other to displace the pressing member, the displacement causing the contacts of the first connector terminals to be pressed down to a position in which they do not come into contact with the bottom face of the second card.

2. The connector device for cards according to claim 1, wherein the housing is provided with a card insertion slot arranged in a front face of the housing and guides arranged on two sides of the card insertion slot to guide the first and second cards into the accommodating section; wherein a first guide face to guide, in contact with a flank of the first card, insertion of the first card and a second guide face to guide, in contact with a flank of the second card, insertion of the second card are formed on each of the guides; and wherein the second guide face is formed in a position lower than the first guide face so that the bottom face of the second card to be inserted into the accommodating section is positioned lower than a bottom face of the first card to be inserted into the accommodating section.

3. The connector device for cards according to claim 2, wherein the pressing member is provided with a suppressor displaceable in a vertical direction to suppress the first connector terminals and a driver to displace downwards the suppressor by its contact with the bottom face of the second card; and wherein the driver is arranged in a position higher than the bottom face of the second card to be inserted into the accommodating section and lower than the bottom face of the first card to be inserted into the accommodating section.

4. The connector device for cards according to claim 3, wherein one end part of the pressing member, which is a part closer to the inlet, is rotatably borne by the accommodating section in the card inserting direction in the accommodating section; wherein the suppressor is formed on the deep end of the pressing member in the card inserting direction; and wherein the suppressor is held in a state of being energized upwards by elasticity of the first connector terminals.

5. The connector device for cards according to claim 1, wherein the first connector terminals are arranged closer to the inlet in the card inserting direction in the accommodating section than the second connector terminals, one end side of each being made up of an elastic piece supported in a cantilever way by an under side of the accommodating section into which the first card and the second card are to be inserted; wherein the pressing member is provided with a suppressor displaceable in the vertical direction to suppress the first connector terminals and a driver to displace downwards the suppressor by its contact with the bottom face of the second card; wherein the driver is formed protruding higher than a position of the bottom face of the second card to be inserted into the accommodating section; and wherein when the first card is inserted, the driver is accommodated into a contact terminal section forming concave formed on a forward edge on an inserting side of the first card.

6. The connector device for cards according to claim 5, wherein the first connector terminals, pivoting on a closer-to-the-inlet side in the card inserting direction, are extended deeper inside in a cantilever way; wherein towards a tip of each is formed the contact to come into contact with the contact terminal section of the first card; wherein the pressing member, pivoting for its rotation on the deep end in the card inserting direction, has towards its tip the suppressor to press the tips of the first connector terminals; and wherein the driver is formed protruding in the vicinity of the suppressor in a direction opposite the suppressor.

7. The connector device for cards according to claim 6, wherein a guide member to guide the second card to a position in which it comes into contact with the driver is arranged on the closer-to-the-inlet side of the pressing member in the card inserting direction.

8. The connector device for cards according to claim 7, wherein the suppressor is energized upwards by the elasticity of the first connector terminals; wherein the guide member is extended, pivoting for its rotation on a deeper side in the card inserting direction; and wherein its tip is engaged with an upper face of the suppressor.

* * * * *